July 2, 1963  L. P. C. J. DUDLEY  3,096,389
THREE-DIMENSIONAL SPATIAL IMAGE PRODUCING DISPLAY DEVICE
Filed Nov. 19, 1958                         2 Sheets-Sheet 1

INVENTOR.
LESLIE P. DUDLEY
BY
*Brumbaugh, Free, Graves & Donohue*
ATTORNEYS

July 2, 1963  L. P. C. J. DUDLEY  3,096,389
THREE-DIMENSIONAL SPATIAL IMAGE PRODUCING DISPLAY DEVICE
Filed Nov. 19, 1958  2 Sheets-Sheet 2

INVENTOR.
LESLIE P. DUDLEY
BY
Brumbaugh, Free, Graves & Donohue
ATTORNEYS

3,096,389
THREE-DIMENSIONAL SPATIAL IMAGE PRODUCING DISPLAY DEVICE

Leslie Peter Clarence Jack Dudley, 1 Beresford Court, Park Road, East Twickenham, England
Filed Nov. 19, 1958, Ser. No. 774,935
1 Claim. (Cl. 88—75)

This invention generally relates to display devices for advertising and other purposes, and more particularly, to an optical device for producing an image of the object to be displayed.

The production of a spatial image is achieved by the use of a concave mirror, preferably of spherical curvature. A spherical mirror is concave if its center of curvature is on the side from which the light is incident. A spatial image is obtained by placing an object of relatively small dimensions in a position slightly to one side of the center of curvature of a spherical concave mirror having a wide aperture in relation to its focal length. If an observer now views the object from a position such that the object lies between his viewpoint and the mirror, then, adjacent the object but to the diametrically opposite side of the center of curvature of the mirror, he will see also an image of the object in space. Under these conditions the image will be of the same size as the object but it will be inverted with respect to both the horizontal and perpendicular axes.

If the object is moved nearer the mirror, it will be seen that the image advances towards the observer and is magnified. On the other hand, if the object is moved away from the mirror towards the observer, it will be seen that the image recedes towards the mirror and is diminished in size.

Accordingly, it is an object of the present invention to provide an apparatus for a display or advertising device in which a part or the whole of an object or objects to be displayed is exhibited in the form of a spatial optical image.

Another object of the present invention is to provide a display device for exhibiting a spatial optical image.

There are three different sets of conditions under which it is possible to produce a spatial image with the aid of a spherical concave mirror. These conditions are:

(1) The object is placed between the center of curvature and the observer. The image, located between the center of curvature and the principal focus, is then real, inverted and diminished.

(2) The object is placed at the center of curvature. The image, located at the center of curvature, is then real, inverted and the same size as the object.

(3) The object is placed between the center of curvature and the principal focus. The image, located between the center of curvature and the observer, is then real, inverted and magnified.

If the object be placed at the principal focus, no image will be formed in practice, although theoretically the image will be formed at infinity. If, finally, the object be placed between the principal focus and the mirror, the image will be formed behind the mirror surface. It will, accordingly, be virtual, upright and magnified.

In the present invention we are mainly concerned with arrangements for producing the conditions designated (2) and (3) above.

In achieving these and other objects, the present invention in one of its aspects provides a mask or housing for shielding from the view of the observer an object to be displayed and the optical arrangement for producing an image of the object. One very convenient and effective way of achieving this optical image of the object to be displayed is by obtaining an illustration of the object or other matter to be displayed by photographic or other suitable means. Of course, the object itself may be used if desired. This illustration, laterally inverted, is then printed on or secured to a suitable opaque support such as a thin sheet of cardboard or metal which support is then mounted in front of a spherical concave mirror. The vertical dimension of this support should not exceed the radius of the mirror so that the entire height of the illustration will be used in forming the spatial image.

To describe this arrangement more particularly, the card is arranged in an upright position at or near the center of curvature of the concave mirror. The card should be so disposed that the illustration is upside down and facing the mirror so that the lower end of the card is at substantially the same horizontal level as the lowest point on the circumference of the mirror. By tilting the mirror slightly away from the observer, or by tilting the card slightly towards the observer, or by a combination of both movements, a suitable angle between the card and mirror will be found at which the image of the illustration appears in space above and clear of the card. The image will, moreover, be correctly oriented about both the vertical and horizontal axes, the actual illustration being, of course, hidden from view by a mask or, if desired, by the housing to be described in greater detail hereinafter.

If no mask or housing is provided, the side of the card which faces the observer may be used, for example, to carry the name of a manufacturer and the side of the card which faces the mirror may be used to carry an illustration of his product. A particularly pleasing effect is obtained if the illustration used to produce the image is in the form known as a "cut-out" and the support is a mirror or other highly reflecting surface.

In a practical embodiment of the invention it is preferable that the support for the illustrative matter and the concave mirror be mounted on a common base. Means may be provided, if desired, for adjusting the angle between the support and the mirror and/or imparting a backward or forward tilt to the complete unit. Likewise, means may be provided for varying the distance between the support and the mirror. Further, the mirror and object angle may be so arranged that the image, instead of appearing above the object, as in the foregoing example, appears to one side of the object or in some other chosen position.

In one very effective embodiment of the invention where no mask is used, the image is arranged to be, in effect, the continuation of the illustrative matter on the observer's side of the support. For example, a flower vase may be depicted on the observer's side of the support, the image being that of a suitable cluster of flowers arranged to appear immediately above the vase.

It will be understood that suitable devices may be introduced so that the image is that of a moving picture produced, for example, by a suitable projector or television receiver. Further, it is also understood that the scope of the invention includes other variations in the masking arrangement and additional optical reflecting mirrors.

In another of its aspects, the invention provides means for correction, so far as is necessary, of the distortion of the image produced by a spherical concave mirror. This distortion is due mainly to three factors. One of these factors is "barrel" distortion, which has the effect of causing straight lines in the object to appear as curved lines in the image. For example, if the object to be displayed is cylindrical in shape and if it is arranged with its longitudinal axis at right-angles to the mirror axis, then the shape of the image will not be precisely cylindrical. The surfaces of the image will appear to be outwardly curved in a convex manner giving it a barrellike appearance. This type of distortion is corrected in accordance with the present invention.

Another form of image distortion, when a three-dimensional object is used, is what may be termed "progressive magnification." As in the case of barrel distortion, progressive magnification is operative transversely to the mirror axis. This type of distortion also is corrected by the present invention.

A further form of image distortion, when a three-dimensional object is used, is what may be termed "progressive elongation." Unlike barrel distortion and progressive magnification, progressive elongation is operative in a direction normal to the mirror surface. This third type of distortion is corrected also by the present invention.

Further novel features that are considered characteristic of this invention are set forth with particularity in the appended claim. The invention itself, however, both as to its organization and method of operation, as well as additional objects and advantages thereof, will best be understood from the following description of several embodiments thereof, when read in connection with the accompanying drawings, in which:

Instead of displaying the original object, a reproduction or model of the object is employed to correct for distortion due to spherical aberration. The edges or surfaces of such reproduction or model are curved inwardly in a concave manner by an amount just sufficient to counterbalance the opposing curvature resulting from barrel distortion. The correct amount of inward curvature to be imparted in a given case to the reproduction or model can be determined most rapidly by trial-and-error methods. This type of distortion is not usually of great significance if the major dimension of the object, measured transversely to the mirror axis, does not exceed about 10 or 15 percent of the mirror aperture.

Figure 1:
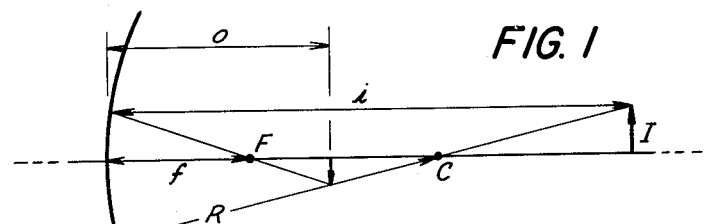
FIGURE 1 illustrates the general law of reflection for a spherical concave mirror.

Referring now to FIGURE 1 of the drawings, the general law of reflection for spherical concave mirrors is illustrated by the following relationship:

$$\frac{1}{i}+\frac{1}{o}=\frac{1}{f}=\frac{2}{R}$$

where $i$ is the image distance, $o$ is the object distance, $f$ is the focal length of a mirror M and R is the radius of curvature of the mirror. It may now be seen that if the object is moved closer to the mirror, the image moves away from the mirror and becomes magnified. Conversely, if the object is moved away from the mirror, the image moves toward the mirror and is diminished in size.

The above symbols are shown in FIGURE 1 of the drawings. In addition, O and I, respectively, in FIGURE 1 denote the object and the image, and F and C denote the points of principal focus and center of curvature, respectively, of the mirror.

From simple geometrical considerations it is evident that:

$$\frac{\text{Object size}}{\text{Object distance}} = \frac{\text{image size}}{\text{image distance}}$$

or $$\frac{\text{Image size}}{\text{Object size}} = \frac{\text{image distance}}{\text{object distance}}$$

but $$\frac{\text{Image size}}{\text{Object size}} = \text{magnification}$$

Therefore:

$$\text{Magnification, } m = \frac{i}{o} \quad (1)$$

Now, reverting to the relationship:

$$\frac{1}{i}+\frac{1}{o}=\frac{1}{f}$$

then $$i = \frac{1}{\frac{1}{f}-\frac{1}{o}}$$

or $$i = \frac{f \cdot o}{o-f} \quad (2)$$

It will be evident that, by the use of Equation 2, the position of the image corresponding to any position of the object can be determined for a mirror of given focal length. Then, with Equation 1, the corresponding magnification can be determined.

By way of example, assume the mirror to have a radius of curvature of 6 inches and, hence, a focal length of 3 inches. Assume, further, that an object having negligible depth or thickness is placed, in succession, at positions 6, 5½, 5, 4½ and 4 inches from the mirror. Then, applying Equations 2 and 1 and tabulating the results:

| Object distance, inches | 6 | 5.5 | 5 | 4.5 | 4 |
|---|---|---|---|---|---|
| Image distance, inches | 6 | 6.6 | 7.5 | 9 | 12 |
| Magnification | 1 | 1.2 | 1.5 | 2 | 3 |

By this example, it becomes evident that the magnification varies progressively from unity with the object at 6 inches from the mirror to three times with the object at 4 inches from the mirror.

Instead of the object being moved to different distances from the mirror, consider an object having a depth (or length) $a$ in the dimension parallel to the mirror axis and a dimension $b$ perpendicular to the mirror axis. This object, then, is located so that its furthest plane from the mirror is at the center of curvature of the mirror. Clearly, then, in this case the image will exhibit progressively increasing magnification ranging from unity at the part most distant from the observer to a maximum at the part nearest the observer.

Figure 2:
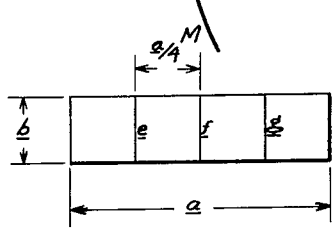
FIGURE 2 shows an illustrative example of a cylindrical object in its true shape.

Assuming, for illustrative purposes, the object to be a cylinder measuring $a=2$ inches in length by $b=½$ inch in diameter, this can be represented in elevation as shown in FIGURE 2 in which the vertical lines $e$, $f$ and $g$ represent circumferential rings drawn around the cylinder at half-inch intervals.

Figure 3:
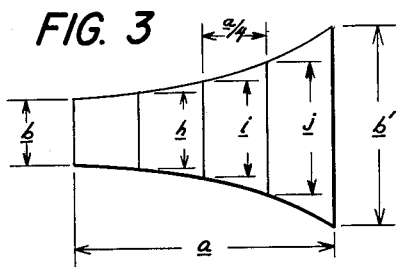
FIGURE 3 shows an image of the object shown in FIGURE 2 distorted by progressive magnification.

Assume, now, that the image is viewed in the right-to-left direction and that the only source of distortion is the progressive magnification described above. Then the image will be bell-shaped, as shown in FIGURE 3, the diameter of the bell ranging progressively from $b=½$ inch at the part most distant from the observer to $b'=1½$ inches at the part nearest him. The intermediate dimensions are $h$, $i$ and $j$. This follows from the fact that, as indicated in the above table, the diameter at the part most distant from the observer (that is, the part corresponding to the 6 inches object distance) will amount to 1×½=½ inch. At the 5.5 inches object distance, the dimension $h$ will be 1.2×½=0.6 inch. Similarly, $i$ will equal ¾ inch and $j$ will equal one inch.

An understanding of the nature of the distortion termed "progressive elongation" will be facilitated by referring again to the table. Considering the figures in relation to the $a$=2 inch by $b$=½ inch cylinder, it will be noted that whereas the object extends towards the mirror from a point 6 inches away to a point 4 inches away (that is, through a distance of 2 inches) the image extends towards the observer from a point 6 inches from the mirror to a point 12 inches from the mirror. Thus, it extends through a distance of 6 inches, so the image has undergone an over-all elongation to three times the length of the object. That length of the object which extends to within 4.5 inches of the mirror corresponds to a portion $r$ of the image which undergoes an over-all elongation of 9−6=3 inches. Now, the length of this portion of the object is 2−0.5=1.5 inches, so it is seen that the corresponding portion of the image has undergone an over-all elongation to twice the length of this portion of the object. Consider, next, that portion of the object which extends to within 5 inches of the mirror. This corresponds to a portion of the image which undergoes an over-all elongation of 7.5−6=1.5 inches. The length of the corresponding portion of the object is 2−1=1 inch, so it is seen that the associated portion of the image has undergone an over-all elongation equal to 1.5 times the length of this portion of the object. Consider, finally, that portion of the object which extends to within 5.5 inches of the mirror. This corresponds to a portion of the image which undergoes an over-all elongation of 6.6−6=0.6 inch. The length of the corresponding portion of the object is 2−1.5=0.5 inch, so it is seen that the associated portion of the image has undergone an over-all elongation equal to 0.6/0.5=1.2 times the length of this portion of the object. As applied to FIGURE 4 of the drawings, the dimensions are as follows: $a'$=6 inches, $p$=0.6 inch, $q$=1.5 inches, and $r$=3 inches.

Figure 4:
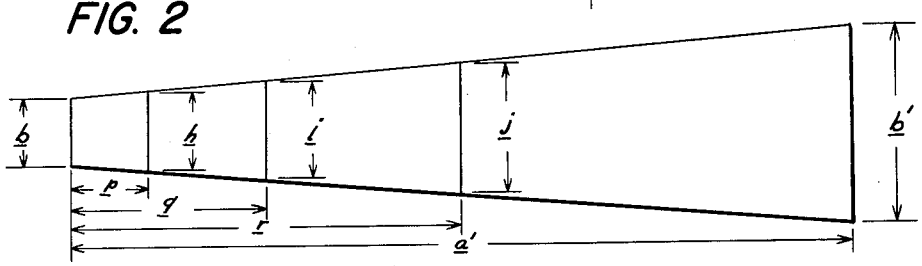
FIGURE 4 shows an image of the object shown in FIGURE 2 distorted by progressive magnification and progressive elongation.

The diagram shown in FIGURE 4 combines the progressive elongation derived above with the progressive magnification illustrated in FIGURE 3, and shows the true shape of the image corresponding to the object depicted in FIGURE 2. The image is a truncated cone with its base nearest the observer, and the circumferential rings $h$, $i$ and $j$ are the same dimensions as those shown in FIGURE 3 but they are "pulled apart" as illustrated by the dimensions $p$, $q$ and $r$ in FIGURE 4.

Now, all the necessary data is available to prepare a model of the object shown in FIGURE 2 such that its image will be an undistorted, magnified reconstitution of the original object.

Since the over-all linear magnification is to be three times, the model must consist of a truncated cone having a length of $a$=2 inches. Further, it is known that the diameter of the cone must vary from $b'$=1½ inches at the base, where the magnification is unity, down to $b$=½ inch where the magnification is three times.

If $\theta$ denotes the apex angle of the cone, then $$\tan \frac{\theta}{2} = \frac{½(1½-½)}{2} = 0.25$$

from which $\theta/2$=14°2′, and $\theta$=28°4′.

Figure 5:
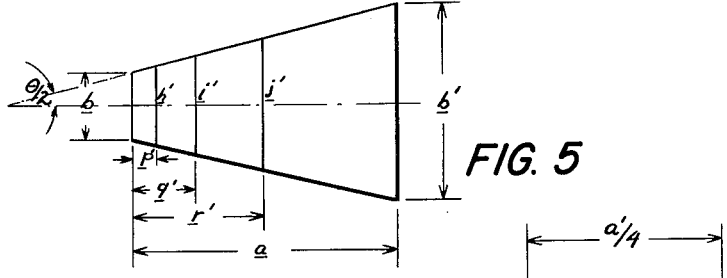
FIGURE 5 shows an illustrative example of a model object constructed in accordance with the principles of the invention.

Finally, the position of the circumferential rings $h'$, $i'$ and $j'$ in FIGURE 5 can be determined by dividing the dimensions 0.6 inch, 1½ inches and 3 inches in FIGURE 4 by the over-all elongation factor of 3.

Figure 6:
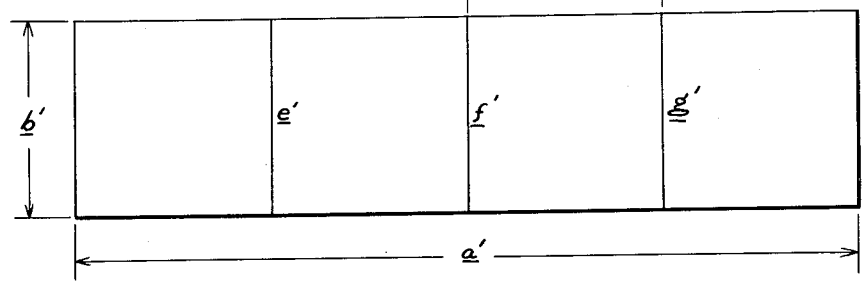
FIGURE 6 shows an image of the model object shown in FIGURE 5.

The completed model is shown in FIGURE 5 in which $h'$, $i'$ and $j'$ denote the circumferential rings, and the positions of these circumferential rings are: $p'$=0.2 inch, $q'$=0.5 inch and $r'$=1 inch. The image of the model will be as shown in FIGURE 6 and will be a reconstitution of the original object shown in FIGURE 2 magnified by a factor of 3. In FIGURE 6, $e'$, $f'$ and $g'$ represent, as will be understood, the images of $h'$, $i'$ and $j'$ in FIGURE 5.

While in the foregoing example the object selected for reproduction in model form is of a simple nature, the same general procedure may be followed in the case of more complex objects. As will be understood, the greater the number of transverse sections into which the object is considered as being divided, the greater will be the accuracy with which the image of the model constitutes a reproduction of the object. About four (as in the example) to six sections will be found adequate for most practical purposes.

Figure 7:
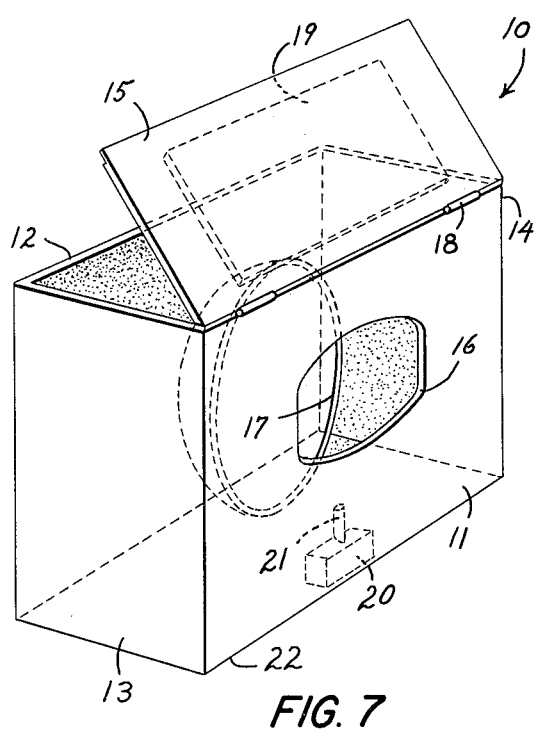
FIGURE 7 illustrates one embodiment of a suitable housing in accordance with the present invention.
Figure 8:
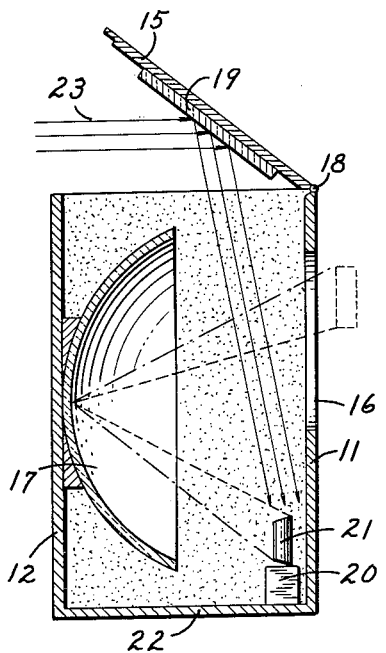
FIGURE 8 illustrates a sectional side elevation of the housing shown in FIGURE 7.

FIGURES 7 and 8 illustrate a preferred embodiment of a housing in which is placed a spherical concave mirror and an object to be viewed. For convenience only, the invention will be described with reference to this embodiment.

A housing 10 is constructed of a front surface 11, back surface 12, end surfaces 13 and 14 and a top surface 15. The inside of each of these surfaces is a suitable black, non-reflective material such that light reflected from these surfaces is a minimum. An aperture or opening 16 located in the front surface 11 is formed in any desired shape depending upon the viewing angle and the area of the mirror to be exposed.

A spherical concave mirror 17 is mounted by any suitable means on the inside of the back surface 12 of the housing 10. The top surface 15 is mounted so that it may be tilted to a desired angle by means of a hinge or other pivotal means 18. A mirror or other reflecting means 19 is secured to the underside of the top surface 15.

The light which enters the housing, whether this be via the mirrored lid or through the front opening or by a combination of both, may be either natural light or artificial light or a combination of both. Provision for an internal source of illumination is also desirable.

In one embodiment of the invention use is made of a source of "invisible light," such as ultraviolet radiation, the object and, if desired, other features of the display being coated with fluorescent substances which glow under the action of such radiation.

In a further embodiment a light source, such as an electric lamp, may be used as the object. This provides an illuminant which is both decorative and useful, the light, apparently originating from the spatial image of the lamp, being concentrated within a solid angle equal and opposite to that subtended at the image by the mirror.

Located just below the opening 16 on the inside of the housing 10 is a mounting 20 which is adjustable so that an object 21 to be viewed will be located below the opening 16. Of course, the object 21 may be the actual object itself or it may be a photographic, or other, illustration of the object. Preferably, however, it is a model of the original object produced in accordance with the principles previously described. The housing 10 may have a bottom surface 22 or it may be open at the bottom to permit the housing 10 to be placed over an object to be viewed.

To show the operation of the present invention with greater particularity, reference is made to FIGURE 8 of the drawings. The top surface 15 of the housing 10 is tilted to a desired angle such that light rays 23 from a suitable light source (not shown) are reflected by the mirror 19 or other suitable reflecting surface to illuminate the object 21. The concave mirror 17 is tilted to a desired angle such that an image of the object 21 will be visible through the opening 16.

Of course, the top surface 15 may, if desired, be closed, the illuminating light beam 23 then being directed through the front opening 16. Actually, the light beam 23 may be directed from any suitable angle from either inside or outside of the housing to illuminate the object 21.

Figure 9:
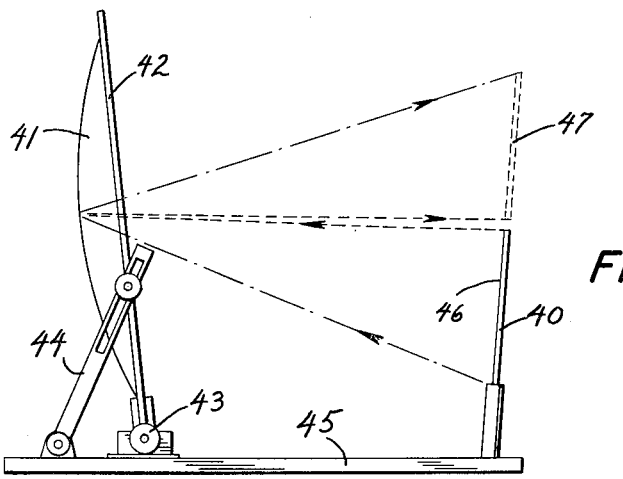
FIGURE 9 is a modified arrangement of the embodiment shown in FIGURES 7 and 8.

In FIGURE 9 of the drawings, a modification of the arrangement shown in FIGURES 7 and 8 is illustrated by providing a suitable support 40 which also functions as a mask. Spaced from the support 40 on a suitable base 45 is a spherical mirror 41 supported by a frame 42. The frame 42 is pivotable about its bottom edge by a hinge 43, and a brace 44 provides additional rigidity for the mirror 41 regardless of the angle of tilt.

It is possible to impart movement to the image by causing relative movement to occur between the object and the mirror. This can be achieved by the incorporation of mechanism, such as an electric motor, which produces a cyclic change in the position of the object or of the mirror or in the positions of both the object and the mirror. If, for example, one edge (say, the left-hand edge) of the mirror be supported in a hinged mounting about which the mirror is caused to pivot by the imparting of a to-and-fro movement to the right-hand edge, then the image will be caused to move back and forth transversely across the observer's field of vision. If the mirror be caused to pivot about a horizontal axis instead of a vertical axis, then the image will move up and down perpendicularly through the observer's field of vision. The required movement of the mirror can be produced conveniently in known manner by the use of an electrically actuated cam, eccentric or crank.

Another way of producing movement of the image by movement of the mirror is to mount the mirror in a suitable manner on the end of a shaft which is rotated slowly by an electric motor. It is preferably for the mirror to be mounted on the motor shaft so that it is positioned eccentrically and/or so that its axis is not parallel to the longitudinal axis of the shaft. This results in elliptical or circular movement of the image combined with progressively changing magnification.

Arrangements for producing movement of the image by movement of the object are advantageous principally when it is desired to bring different displays, or different portions of the same display, successively into view. In such cases the desired movement, which can be continuous or intermittent, can be readily produced by mounting the objects or displays on an electrically actuated moving platform, turntable or the like.

For those cases in which the object consists of a picture or other illustrative matter, a projected picture as from, for example, a motion picture projector, may be utilized. The most convenient way of arranging this is as follows. The customary picture or other illustrative matter is replaced by a translucent screen of the same size as such picture or other matter, and the projected pictures are caused to fall on that side of the screen which is remote from the mirror. Suitable masking means is introduced so that the screen is not seen direct but only after reflection by the concave mirror.

It is sometimes convenient so to arrange matters that the optical axis of the projector is at a higher or lower level than the mirror axis, or to one side or the other thereof. In such cases additional reflecting and/or refracting members, that is to say, one or more mirrors and/or prisms, can be introduced into the path of the projector beam in order to provide for the beam to reach the screen in a direction substantially normal to the surface of the latter.

As will be understood, it is preferable that means should be introduced to counteract the spherical aberration due to the concave mirror. A convenient way of achieving this object is to employ a projection lens which is "overcorrected" for spherical aberration; that is to say, a lens which would normally produce "pin-cushion" (instead of "barrel") distortion, such a lens tending to make straight lines curve inward in a concave manner instead of outward in a convex manner. Alternatively, a suitable supplementary lens may be employed in conjunction with a normal projection lens.

Obviously, many modifications and variations of the present invention are possible in the light of the above disclosure. Therefore, it is to be understood that the invention is not limited in its applications to the details of construction and arrangement of parts specifically described or illustrated, and that within the scope of the appended claim it may be practiced otherwise than as specifically described or illustrated.

I claim:

A display apparatus for producing a three-dimensional spatial optical image comprising a substantially spherical concave mirror, a three-dimensional model of a three-dimensional object to be viewed positioned in front of said mirror so that various portions of the model are at different distances from the mirror, means in front of said mirror to support said model substantially at a position to one side of the optical axis of said mirror, a mask located adjacent said model on a side furthermost from said mirror so that said model is obscured from view, the dimensions of said model measured transversely to the mirror axis being proportionately progressively smaller than the dimensions of the corresponding object in a direction toward said mirror in proportion to the progressive magnification caused by said mirror, and the dimensions of the model measured parallel to the mirror axis being proportionately progressively shorter than the dimensions of the corresponding object in a direction toward the mirror in proportion to the progressive elongation caused by said mirror so that the spatial image reflected by said mirror will appear to a viewer as being a substantially undistorted reconstitution of the original object.

References Cited in the file of this patent

UNITED STATES PATENTS

| | | |
|---|---|---|
| 697,738 | Miller | Apr. 15, 1902 |
| 1,053,650 | Saalbury | Feb. 18, 1913 |
| 1,528,021 | Janzer | Mar. 3, 1925 |
| 1,699,689 | Curry | Jan. 22, 1929 |
| 1,972,019 | Kanolt | Aug. 28, 1934 |
| 2,157,138 | Mendez | May 9, 1939 |
| 2,299,682 | Conant | Oct. 20, 1942 |
| 2,576,147 | Sauvage | Nov. 27, 1951 |
| 2,635,359 | Broscious | Apr. 21, 1953 |
| 2,698,553 | Copeland | July 4, 1955 |
| 2,961,778 | De Florez et al. | Nov. 29, 1960 |

OTHER REFERENCES

Luckiesh: "Visual Illusions and Their Applications," D. Van Nostrand Co., 1922, page 197, paragraph 2.